June 18, 1968 S. V. CHAVIRA ET AL 3,388,925
TRUCK STEP
Filed Dec. 5, 1966 2 Sheets-Sheet 1

INVENTORS,
SALVADOR V. CHAVIRA,
BY ALBERT M. MARTINEZ;

ATTORNEY

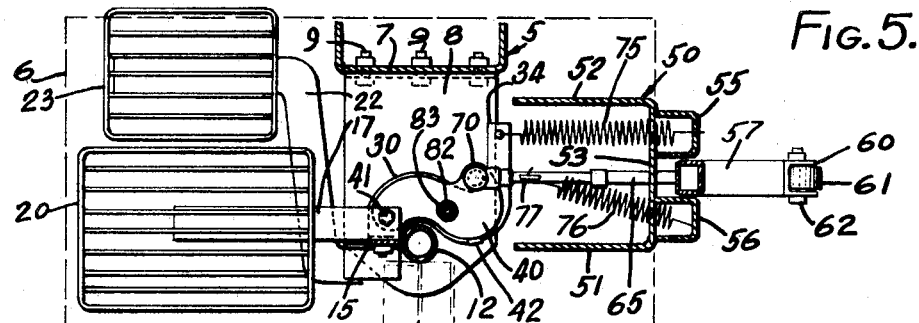
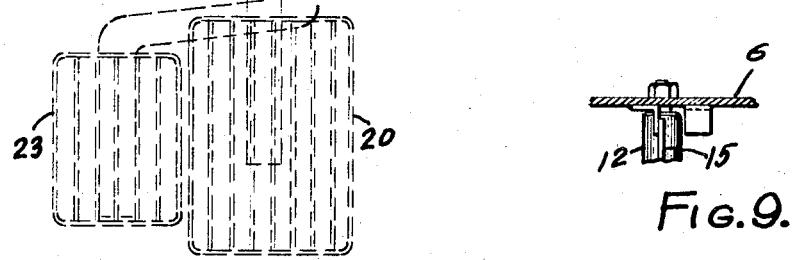
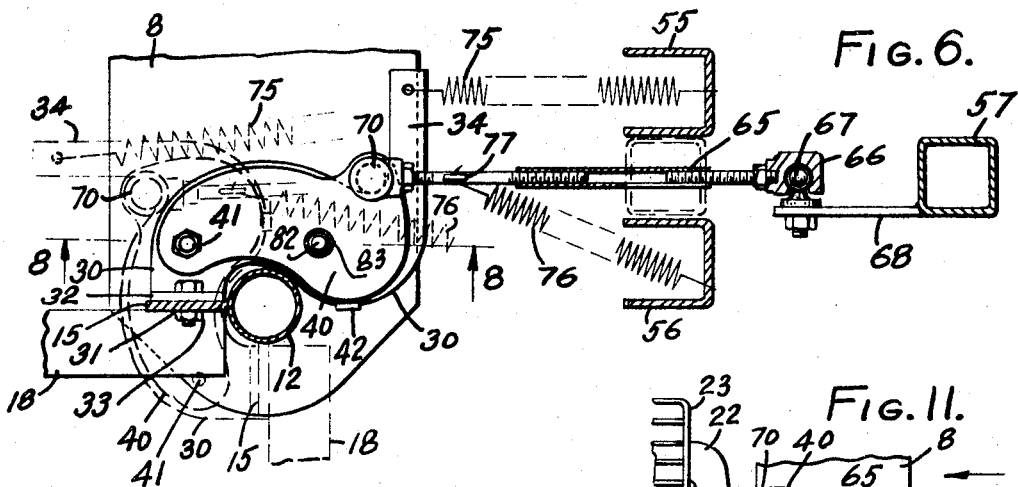
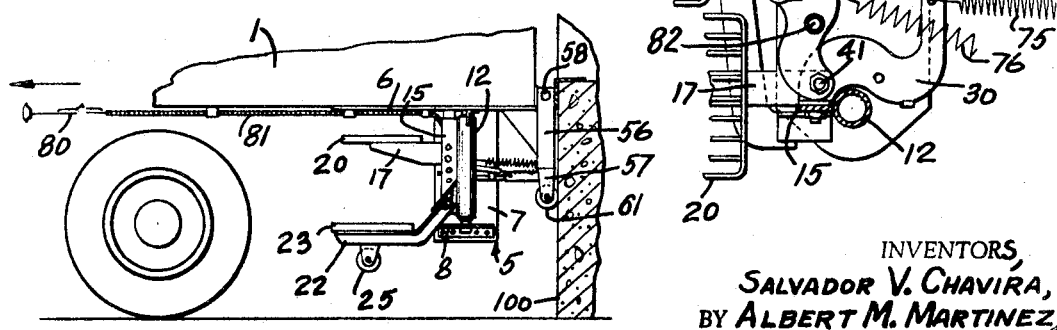
INVENTORS,
SALVADOR V. CHAVIRA,
BY ALBERT M. MARTINEZ;
ATTORNEY 3,388,925
TRUCK STEP
Salvador V. Chavira, 1330 N. Alma St. 90063, and
Albert M. Martinez, 961 S. Fetterly Ave. 90022, both
of Los Angeles, Calif.
Filed Dec. 5, 1966, Ser. No. 599,679
5 Claims. (Cl. 280—166)

ABSTRACT OF THE DISCLOSURE

The present apparatus comprises one or more steps secured to a rotatable post, the post being mounted beneath the truck bed adjacent the tailgate portion thereof; a lever is adapted to project from the tailgate portion of the truck for contact with a dock wall when the truck is moved backwardly towards the dock, such movement swings the lever inwardly towards the tailgate portion of the truck and in so doing rotates the post to swing the steps outwardly at one side of the truck; as long as the truck remains adjacent the dock wall the steps are held at one side of the truck and when the truck moves from the dock the lever again extends outwardly and the post rotates to position the steps beneath the truck.

---

The present invention relates to and has for an object the provision of a step or steps for a truck of the character wherein the step is normally maintained under the truck, and which step or steps may be automatically projected outwardly from the truck when the rear end of the truck is adjacent a dock or platform, whereby a workman may ascend or descend the step or steps onto the dock or platform.

A further object is the provision of a truck step adapted to normally be positioned beneath the truck adjacent the rear end or tailgate portion thereof and which steps may be projected outwardly by automatic means when the rear end of the truck backs against a dock or which step under operation of the truck driver may disengage such automatic operation and maintain the step beneath the truck.

A further object is the provision of a truck step so constructed and arranged as to be disposed in and out of the way position beneath the bed of the truck and which may be swung outwardly to one side of the truck for use when the truck is backed against a platform.

A further object is the provision of a truck step so constituted and arranged as to prevent injury to the step if the step should encounter an obstruction.

Other objects of the invention consist of a construction which is inexpensive in cost of manufacture, foolproof in operation, easily controlled by an operator to be functional or non-functional and which is generally superior to truck steps now known to the inventors.

With the above and other objects in view, the invention consists in the novel and useful provision, formation, construction, association and relative arrangement of parts, members and features, all as shown in one embodiment in the accompanying drawings, described generally and more particularly pointed out in the claims.

In the drawing:

FIGURE 5 is a fragmentary, sectional view on an enlarged scale, taken on the line 5—5 of FIGURE 3;

FIGURE 6 is a fragmentary, sectional view on an enlarged scale, taken on the line 6—6 of FIGURE 3;

FIGURE 9 is a fragmentary, partially sectional view on an enlarged scale, taken on the line 9—9 of FIGURE 3;

FIGURE 10 is a fragmentary, partially sectional view on an enlarged scale, and similar to that of FIGURE 2; and, FIGURE 11 is a fragmentary, partially sectional view showing parts in moved position from that of FIGURE 5.

Figure 1:
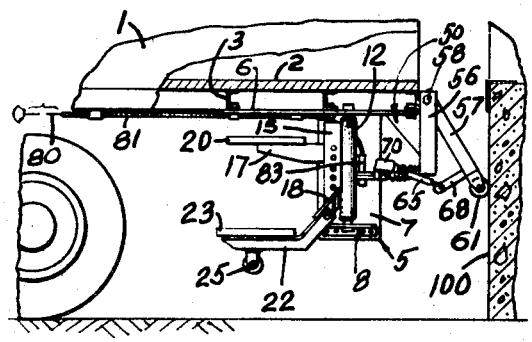
FIGURE 1 is a fragmentary, partially sectional view of a truck incorporating the truck step of the invention and the operating mechanism therefor.
Figure 2:
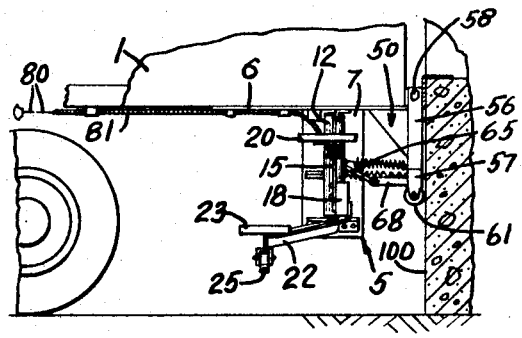
FIGURE 2 is a view similar to that of FIGURE 1, certain parts being in moved position.
Figure 3:
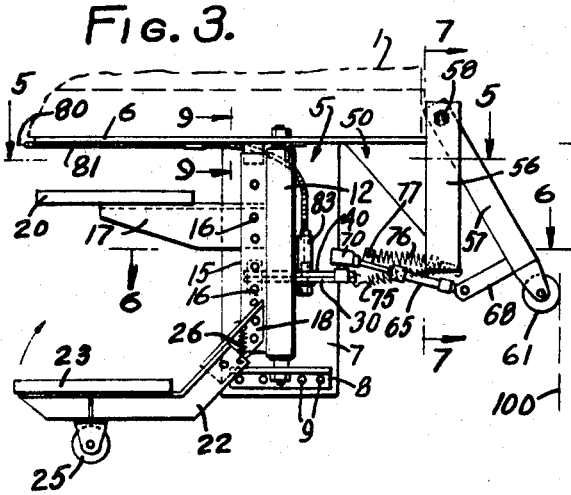
FIGURE 3 is a fragmentary, partially sectional view on an enlarged scale from that of FIGURES 1 and 2 of the truck step and the operating mechanism therefor.
Figure 4:
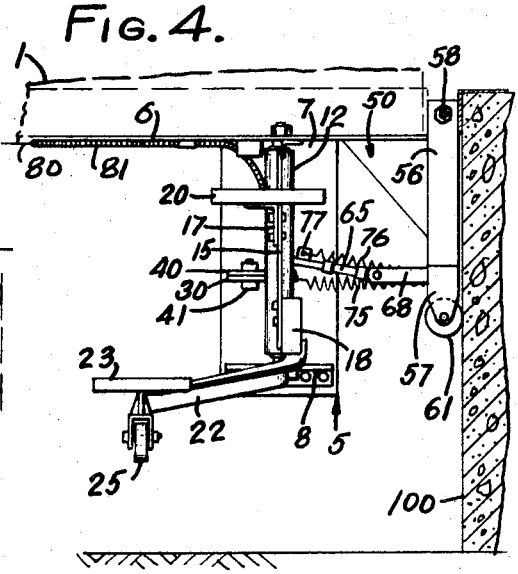
FIGURE 4 is a view similar to FIGURE 3, certain parts being in moved position.
Figure 8:
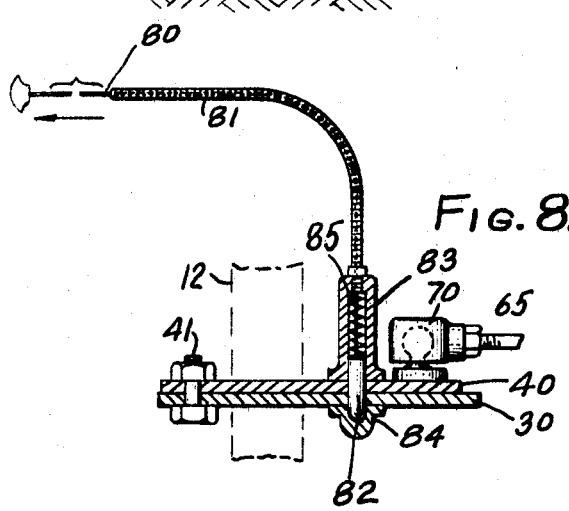
FIGURE 8 is a fragmentary sectional view on an enlarged scale, taken on the line 8—8 of FIGURE 6.

Referring now to the drawings, there is shown in FIGURES 1 to 4 inclusive a portion of the rear end of a truck 1 having a bed 2 and the usual framing 3, the truck at the rear end and beneath the bed thereof having attached to the framing a step assembly 5. The step assembly includes a top plate 6 secured to the framing 3 of the truck to position said truck step assembly beneath the truck and adjacent the rear end thereof. Depending from the top plate 6 is a channel sectioned support post 7 to which post is secured at the lower end thereof, a lower support plate 8 by bolts 9. The lower support plate is maintained in substantially right angular position to the plane of the web of the support post 7. Journalled for rotation between the top plate and the lower support plate is a tubular post 12. Tubular post 12 is provided exteriorly and radially thereof with a strip or flange 15. The flange is provided with a series of transverse bores as shown at 16 for adjustably positioning and holding step support arms 17 and 18. Arm 17 has attached thereto a step 20 as shown in FIGURE 5. The step support arms are of angular construction. The step support arm 18 has hinged or pivoted thereto a step support bar or arm 22 having two portions in angular relationship as shown in FIGURES 1 and 3 with a step 23 carried by said arm. The arrangement of the arms 18 and 22 is such that the flanges cooperate to hold the same in the position either as shown in FIGURES 1 and 3 or to allow the arm 22 to be swung upwardly. The arm 22 beneath the step 23 is provided with a caster 25 for elevating the arm in case the caster engages an obstruction and to prevent damage to the step and the arm. The arm 22 with its step is maintained in the position of FIGURES 1 and 3 by means of a tension spring 26 positioned between the arm portions 18 and 22.

A lever 30 has one end thereof secured to flange 15 as shown in FIGURE 6 at 31. The lever 30 is of ogee form and provided with an upright flange 32 at one end for abutment with the flange 15 with the end 32 bolted at 33 to the flange. The opposite end of the lever 30 has an extension 34. Adapted to overlie lever 30 is lever 40 of ogee form and levers 30 and 40 are secured together by means 41 such as by a bolt passed through holes in said levers for permitting the lever 40 to be rotated relative to lever 30 in the manner shown in FIGURE 11. A stop lug 42 is carried by lever 30 for engagement against an edge of lever 40, the ogee arrangement permitting both levers to be spaced from the tubular post 12, as shown in the several figures.

Figure 7:
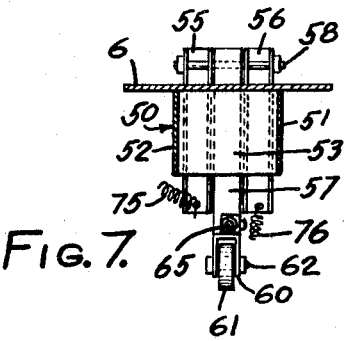
FIGURE 7 is a sectional view on the line 7—7 of FIGURE 3.

Secured to the top plate 6 and depending therefrom at the end of said top plate opposite the steps, as shown in FIGURE 5, is a U-shaped channel support casing 50, said support casing including parallel flanges 51 and 52 and an interconnecting web 53. Secured exteriorly of the web 53 are a pair of elongated channel members 55 and 56 and positioned between said channel members 55 and 56 is a square sectioned tubular arm 57 the upper end of which is pivoted between said channel members 55 and 56, as shown at 58 in FIGURE 7. It will be noted from FIGURES 1 to 4 inclusive that the top plate is secured to the truck beneath the bed so that the channel members 55 and 56, as well as the arm 57, projects beyond the truck bed. The arm 57 is bifurcated at its outer end 60 and a roller 61 is received between bifurcations and secured in any appropriate manner such as by bolt 62. The arm 57 is adapted to actuate and swing the lever 40 when the arm and particularly the roller 61 engages an object as shown in FIGURES 1 and 2. A link 65 of turnbuckle form carries a socket member 66 for a ball 67 carried by an extension 68 secured to the arm 57. The link in turn is secured to the end of the lever 40 opposite the pivot point 41 as shown at 70, the link by being of turnbuckle form allows adjustment as to the length of the link and the end 70 is similarly constructed so that the link may swing relative to the arm 40. This is likewise true of the ball and socket arrangement at 66 and 67. It will be noted that the link lies between the channel members 55 and 56 in its connection with the arm 57. Tension springs are provided at 75 and 76, spring 75 being secured at one end to the extension 34 and the opposite end to the channel member 55 while spring 76 is secured to channel member 56 and to an eye 77 carried by the link 65. It is to be noted that when the link and the extension 68 are in the position of FIGURE 1 that the steps 20 and 23 are positioned beneath the bed of the truck and that when the arm 57 is moved from the position shown in FIGURE 1 to that of FIGURE 2 that the springs 75 and 76 are tensioned due to movement of the levers 30 and 40, as shown by dotted lines in FIGURE 6. The arm 57 is substantially at a 30° angle to the channel members 55 and 56 when the arm is extended for engagement with an object such as a platform or dock. At this time the extension 68 and the link 65 are in angular relationship, see FIGURES 1 and 3. When the arm is moved so as to be received between the channel members 55 and 56, as shown in FIGURE 2, the steps are swung outwardly from beneath the truck from the position of FIGURE 5 in full lines to that in dotted lines making a substantial 90° turn due to the lazy tong arrangement of the link 65 and extension 68 which multiples the turning radius of the tubular post 12 to substantially 90° with respect to a 30° movement of the arm 57.

If it is not desired to move the steps from a position beneath the truck bed to an outward position thereof, the truck driver or operator is provided with means for releasing lever 30 from lever 40 so that rotation of the lever 40 does not produce movement of the lever 30. In the simplest embodiment the operator has positioned within the truck cab means comprising a flexible wire 80 within a suitable sheath 81 connecting with a spring actuated pin 82 in a casing 83 which casing is secured to lever 40. Lever 30 is provided with a cap 84 and both levers are provided with matching bores whereby when the levers are properly positioned the pin 82 may pass through said bores to lock said levers together. The pin is urged into a locking position with the levers by means of a coil spring 85. Releasing the pin 82 by pulling the wire 80 will compress spring 85 in the usual manner and release the two levers to permit the lever 40 to rotate about its pivot point 41 independent of any movement of lever 30.

The operation, uses and advantages of the invention are as follows.

Assuming that a truck is provided with the mechanism of the invention at the rear or tailgate thereof with the parts in the position shown in FIGURES 1 and 3, when the truck is backed up to a dock or a platform, the roller 61 will strike the vertical wall 100 of the platform or dock and upon continued backing of the truck the lever will be moved to the position of FIGURE 2. If the two levers 30 and 40 are interconnected by the pin 82, movement of the arm 57 will produce joint rotation of the two levers to turn the tubular post 12 and project the steps from the position of FIGURE 1 to that of FIGURE 2 or from the full line position for the steps of FIGURE 5 to the dotted line position for said steps in said figure. As long as the arm 57 remains in the position shown in FIGURE 2, the steps will be positioned outwardly from the truck whereby the operator or truckman may ascend the steps to the top of the dock or platform. When the truck driver or operator desires to retract the steps beneath the truck bed, the truck is moved from the position of FIGURE 2 to that of FIGURE 1 which permits the arm 57 to move to the position of FIGURE 1 followed by a return swing of the steps beneath the truck bed due to the tension springs 75 and 76 acting upon the linkage 65 and the extension 34 of lever 30.

To avoid damage to the lower step 23, the arms 18 and 22 are hinged or pivoted together with arm 18 secured to flange 15 carried by the tubular post 12 and any obstruction will strike the roller 25 carried by arm 22 to move the same upwardly without damaging the arm or step.

Linkage adjustment is facilitated by the turnbuckle construction and the parts are simply arranged for easy adjustment and replacement in case of any damage.

We claim:

1. A truck step construction, including: a plate for attachment beneath the truck bed, a rotatable post depending from said plate, a step carrying arm extending from said post, an arm pivoted at one end to said plate and normally extending beyond the truck bed and linkage between said arm and the rotatable post for rotating the post when the arm is moved to project the step from beneath the truck bed.

2. A truck step construction, including: a top and a bottom plate, the top plate secured to the truck beneath the bed thereof, a post journalled for rotation between said top and bottom plates, a step arm projecting radially from the post and a step carried by the step arm, and means for rotating the post consequent upon said means contacting an obstruction to project the step from beneath the truck to a position outwardly at one side thereof.

3. A truck step, including: a rotatable post secured to the truck beneath the bed thereof, a step arm radially extending from said post and a step carried by said arm, a lever secured at one end to said post and resilient means for the opposite end of said lever normally positioning the lever and the post to maintain the step beneath the truck bed, and means including a pivoted arm for turning the post and said lever to project the step from beneath the truck and to one side of the truck.

4. A truck step, including: an axially rotatable post secured beneath the truck body, said post provided with an external flange, a step arm secured to said flange, and a step carried by the arm, a lever secured at one end to said flange and a spring secured to the opposite end of said lever to normally maintain the lever in position to maintain the step beneath the bed of the truck, a second lever overlying the first lever and pivoted at one end to said first lever, an arm, and linkage between said arm and secured to the second lever at its opposite end, and releasable means for locking the first and second levers together whereby movement of the arm through said linkage will rotate the post to project the step from beneath the truck outwardly thereof to one side of the truck.

5. The device of claim 4, and a spring for normally urging the second lever to overlie the first lever for locking engagement therebetween.

References Cited

UNITED STATES PATENTS

| 814,687 | 3/1906 | Gault | 182—89 |
|---|---|---|---|
| 3,329,443 | 7/1907 | Lowder et al. | 280—166 |

RICHARD J. JOHNSON, *Primary Examiner.*

R. R. SONG, *Assistant Examiner.*